United States Patent [19]

Recker

[11] 3,992,119
[45] Nov. 16, 1976

[54] SHAFT COUPLING

[76] Inventor: Florian B. Recker, 802 First St., SE., Dyersville, Iowa 52040

[22] Filed: Mar. 13, 1975

[21] Appl. No.: 558,136

[52] U.S. Cl. .............................. 403/316; 403/322; 285/316; 64/6; 403/359
[51] Int. Cl.² ........................................ F16B 7/00
[58] Field of Search .......... 403/322, 325, 359, 316, 403/317, 324, 315, 359, 327; 285/316, 85, 84, 86, 91, 308, 315, 317; 64/6, 32 R, 4

[56] References Cited
UNITED STATES PATENTS

| 2,448,278 | 8/1948 | Ronning | 403/359 |
| 3,179,450 | 4/1965 | Recker | 403/325 |
| 3,357,206 | 12/1967 | Christie | 64/6 |

FOREIGN PATENTS OR APPLICATIONS

| 1,102,886 | 5/1955 | France | 403/322 |

Primary Examiner—Andrew V. Kundrat
Attorney, Agent, or Firm—Henderson, Strom & Sturm

[57] ABSTRACT

Apparatus for connecting one shaft to another shaft wherein one of the shafts to be coupled has a plurality of splines or grooves around the periphery thereof, an intermediate portion of the spline shaft having the splines removed. A housing is adapted to be connected to the other shaft of the coupling and has a central opening therein with splines and grooves around the periphery thereof to mate with the splines and grooves of the first mentioned shaft. A sleeve, also having complimentary splines and grooves therein, is rotatably received within the interior of the housing adjacent the inner end of the splined and grooved section of the housing opening. A pin extends through a hole in the housing and the pin is linked to the sleeve, whereby movement of the pin effects rotary movement of the sleeve. The pin, and thereby the sleeve, is biased to a first position, whereby the splines and grooves of the sleeve are misaligned with the splines and grooves of the opening in the housing. The pin is movable by overcoming the bias of the spring to thereby move the sleeve to a position whereby the splines and grooves thereon are aligned with the splines and grooves around the periphery of the opening in the housing.

9 Claims, 7 Drawing Figures

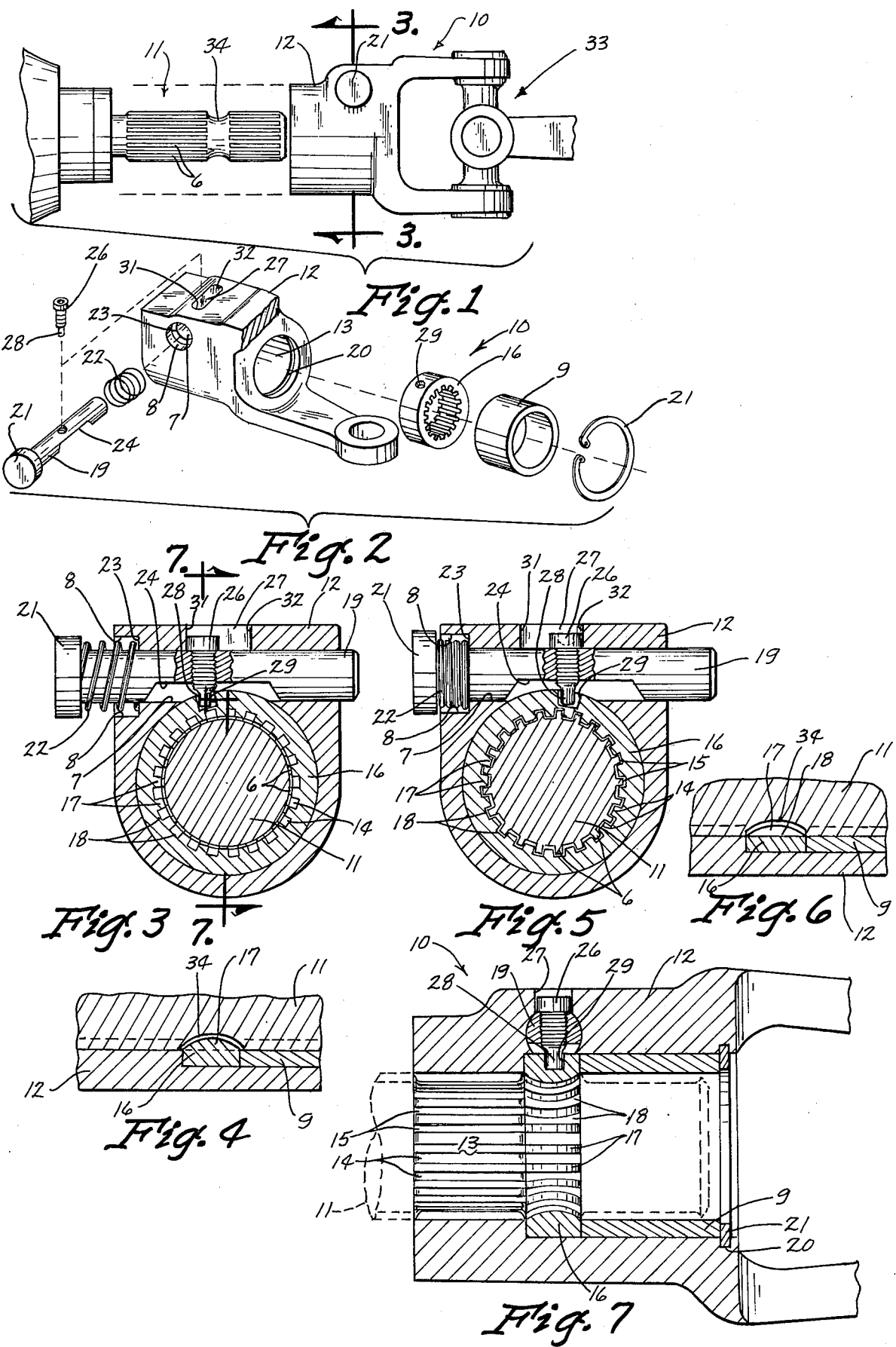

SHAFT COUPLING

BACKGROUND OF THE INVENTION

The present invention relates generally to shaft couplings and more particularly to a shaft coupling for transmitting a torque force from one shaft to another.

The problem of how to couple one shaft to another for transmitting a torque force is a longstanding one. This has particularly been true in the farming community because the power take-off of an agricultural tractor frequently needs to be connected and disconnected to utilize one implement and then another. This problem has been solved in the past in one degree or another, and one of the most commercially successful of these solutions is a connection of the type disclosed in U.S. Pat. No. 2,448,278, which was patented in 1948.

In U.S. Pat. No. 2,448,278, a pin is spring biased to one position within a coupling housing such that it will contact and hold one spline of a power take-off to thereby hold the coupling together. In another position of the pin, it is moved so that it does not block or contact any of the splines and thereby allows the housing to be removed from the power take-off shaft.

Since the time that the coupling disclosed in U.S. Pat. No. 2,448,278 was developed, the horse-power rating of typical agricultural tractors has continued to increase. Because of the very high torque which can be developed from the power take-offs of modern day agricultural tractors, it is desirable that the coupling be held at more than one point and on more than one spline of the power take-off shaft. A French Pat. No. 1,102,886 patented in 1955, discloses a design for locking on all of the splines of a power take-off shaft, but this design has not become a commercial success, at least not in this country, presumably because of its somewhat complicated structure utilized to position and bias the locking splines.

SUMMARY OF THE INVENTION

The present invention relates to a torque transmitting coupling having a housing adapted to receive a non-circular shaft into a complimentarily shaped non-circular opening in the housing. A sleeve, also of a shape complementary to the shaft and having, is rotatably disposed within a portion of the opening. A hole in the housing slidably receives a pin which is interlocked with the sleeve, so that movement of the pin controls the movement of the sleeve. The pin, and thereby the sleeve, by virtue of the interlock, is biased to one position and is movable by overcoming the bias to another position. In the position to which the sleeve is initially biased, the splines and grooves of the sleeve are misaligned with the splines and grooves of the non-circular opening in the housing. In the second position of the sleeve, when the bias is overcome, the splines and grooves of the sleeve are aligned with the splines and grooves within the opening in the housing. Consequently, movement of the pin and sleeve to the second position allows the housing of the torque transmitting coupling to be slid completely onto the shaft, and release of the pin then allows the biasing mechanism to move the collar and sleeve into a locking position. By utilizing a reverse process, the housing may be quickly and easily removed from the shaft.

An object of thee present invention is to provide a torque transmitting coupling which will withstand a very high torque force.

Another object of the invention is to provide a torque transmitting coupling which is extremely easy and simply to couple and uncouple.

A further object of the invention is to provide a torque transmitting coupling which is both dependable to use and economical to produce.

Still another object of the invention is to provide a coupling which is able to be produced by slight modifications of existing commercial structures.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a side or plan view of the present invention, shown in readiness to be connected to a tractor power take-off shaft;

FIG. 2 is an exploded perspective view of the present invention;

FIG. 3 is a cross-sectional view taken along line 3—3 of FIG. 1 and showing the present invention in a locked or misaligned position;

FIG. 4 is a partial cross-sectional view taken along line 7—7 of FIG. 3 and showing the device in a locked or misaligned position;

FIG. 5 is a cross-sectional view, like FIG. 3, but showing the device in an unlocked or aligned position;

FIG. 6 is a view, like FIG. 4, but showing the device in an unlocked position; and FIG. 7 is a cross-sectional view taken along line 7—7 of FIG. 3.

DESCRIPTION OF THE PREFERRED EMBODIMENT

Referring now to the drawings wherein like reference numerals designate identical or corresponding parts throughout the several views, FIG. 1 shows preferred embodiment of the coupling 10 in readiness to be attached to the power take-off shaft 11 of the tractor.

The coupling 10 of the present invention is comprised basically of a housing 12 having an opening 13 passing therethrough. One end of the opening 13 has a series of evenly spaced splines 14 and grooves 15 longitudinally disposed therealong. A sleeve 16 is rotatably disposed within the opening 13. The sleeve 16 also has a series of splines 17 and grooves 18 disposed around the inner periphery thereof. These splines 17 and grooves 18 have the same general spacing and configuration as splines and grooves 14 and 15 respectively in the housing 12. The splined sleeve 16 is held in place by a spacer sleeve 9, which is, in turn, locked into position by a snap ring 21 which fits into a groove 20 in one end of the opening 13 of the housing 12.

Directly adjacent the collar 16 is a hole 7 which passes through the housing 12. This hole 7 has a counterbore 8 on one end thereof. A pin 19 is slidably received in the hole 7, as can best be seen in FIGS. 3 and 5. One end of the pin 19 has an enlarged head 21, which abuts one end of a spring 22. The other end of the spring 22 abuts a shoulder 23 of the counterbore 8. Another distinct feature of the pin 19, as shown in FIGS. 3 and 5 is a cut-out portion 24, which is provided in order to allow the sleeve 16 to protrude slightly into the hole 7 in the housing 12. A bolt 26 is threadly engaged into the pin 19, as best seen in FIGS. 3, 5 and 7. This bolt 26 preferably has a countersunk Allen wrench head, but other interlocking devices are satisfactory. This bolt 26 extends through a slot 27 in housing 12. A reduced portion 28, on one end of the bolt 26, is received into a bore 29 in the sleeve 16. It can be seen therefore that the bolt 26 serves to interlock the pin 19 with the sleeve 16, whereby movement of the pin 19 from the first position, in which the pin 26 is in abutment with the end 31 of the slot 27, to a position, as shown in FIG. 5, wherein the bolt 26 is in abutment with the end 32 of the slot 27, effects a respective movement of the sleeve 16 from the first position of the sleeve 16, as shown in FIG. 3, to a second position as shown in FIG. 5.

In operation, the tractor would be backed up to an implement having a coupler 10 of the present invention attached thereto, through an universal joint 33 (FIG. 1). The tractor operator would first be sure that the power take-off was disengaged, such that the shaft 11 is not in motion. The coupler 10 would then be manually placed onto the power take-off shaft 11, by first manually pushing the head 21 of the pin 19 from the position shown in FIG. 3 to the position shown in FIG. 5, and then sliding the coupler body 12 onto the power take-off shaft 11 such that the splines 6 of the shaft 11 slide into the aligned grooves 15 of the housing 12 and 18 of the sleeve 16. Once the coupler 10 has been slid completely onto the power take-off shaft 11, the pressure is released from the head 21 of the pin 19 and the spring 22 will thereby return the pin 19 to the position shown in FIG. 3 and thereby automatically return the sleeve 16 also to the position shown in FIG. 3, that is, into a locking position, whereby the splines 17 of the sleeve 16 are misaligned with respect to the splines 14 of the housing 12, but aligned with respect to the grooves 15 of the housing 12 and with the splines 6 of the shaft 11. It is to be understood that this sleeve 16 can rotate within the groove 34 of the power take-off shaft 11, to thereby move from a locking to an unlocking position. Once the coupler 10 has been coupled to the power take-off shaft 11, the tractor operator is then free to mount the tractor, engage the power take-off and then proceed to utilize the implement connecting to the tractor.

When it is desired to disconnect the implement from the power take-off shaft 11, the process mentioned in the paragraph above is reversed, whereby the tractor operator would disengage the power take-off, move the pin 19 and thereby the sleeve 16 manually from the position shown in FIG. 3 to the position shown in FIG. 5, and, while holding the collar in the position shown in FIG. 5 pull the coupling 10, with a sliding movement, away from the power take-off shaft 11.

Accordingly, it is noted that the disclosed embodiment of this invention accomplishes all of the objects referred to above. Obviously many modifications and variations of the present invention are possible in light of the above teachings. It is therefore, to be understood that, within the scope of the appended claims, the invention may be practiced otherwise than as specifically described.

I claim:
1. A torque transmitting coupling comprising:
    a housing;
    an opening in said housing, a portion of said opening being circular and a portion of said opening being non-circular, said opening being adapted to receive a non-circular portion of a shaft;
    a sleeve rotatably disposed within said circular portion of said opening, the inner configuration of said sleeve being of the same general shape as the shape of the non-circular portion of the opening in the housing;
    a hole in said housing adjacent the sleeve;
    a pin slidably received in said hole;
    means for limiting the movement of said pin to a linear movement; and
    means for linking the pin to the sleeve such that movement of the pin controls rotary movement of the sleeve.
2. A torque transmitting coupling as defined in claim 1 wherein said linking means comprises a bore in the outer periphery of the sleeve; and a member attached to the pin having a portion thereof extending into the bore in the sleeve.
3. A torque transmitting coupling as defined in claim 2 including a slot in the housing into which a section of said member extends, the ends of said slot forming stops for limiting the extreme movement of said pin and thereby limiting the extreme movement of the sleeve.
4. A torque transmitting coupling as defined in claim 1 including means for biasing said pin and thereby said sleeve to one position.
5. A torque transmitting coupling as defined in claim 4 wherein in one position the inner non-circular portion of said sleeve is aligned with the non-circular portion of the opening in the housing.
6. A torque transmitting coupling as defined in claim 5 wherein said non-circular portion of the opening in said housing has a series of equidistantly spaced longitudinal grooves and splines.
7. A torque transmitting coupling as defined in claim 6 wherein a shaft is adapted to be received in the non-circular portion of the opening in the housing, said shaft having a shape complimentary to the groove and spline of said opening and further having an intermediate annular section of said shaft with the splines removed, said annular section being adapted to receive a portion of said sleeve.
8. A torque transmitting coupling as defined in claim 7 wherein said shaft has twenty-one splines about the periphery thereof.
9. A torque transmitting coupling as defined in claim 8 wherein said shaft has six splines around the periphery thereof.

* * * * *